US006360140B1

(12) United States Patent
Vidondo

(10) Patent No.: US 6,360,140 B1
(45) Date of Patent: Mar. 19, 2002

(54) PRODUCT DISPENSER WITH INVENTORY MONITORING

(75) Inventor: Félix Guindualain Vidondo, Peralta (ES)

(73) Assignee: Jofemar, S.A., Peralta (ES)

( * ) Notice: Subject to any disclaimer, the term of this patent is extended or adjusted under 35 U.S.C. 154(b) by 0 days.

(21) Appl. No.: 09/449,365

(22) Filed: Nov. 24, 1999

(30) Foreign Application Priority Data

Nov. 27, 1998 (EP) ........................................... P9802495

(51) Int. Cl.7 ............................................... G06F 17/00

(52) U.S. Cl. .......................... 700/236; 700/232; 221/2; 221/7; 221/85; 221/129; 221/150 HL

(58) Field of Search ............................ 221/2, 7, 9, 13, 221/76, 85, 96, 129, 133, 150 R, 150 HL; 700/235, 236, 232

(56) References Cited

U.S. PATENT DOCUMENTS

| | | | | |
|---|---|---|---|---|
| 3,831,807 A | | 8/1974 | Deaton et al. | 221/85 |
| 4,108,333 A | | 8/1978 | Falk et al. | |
| 4,252,250 A | * | 2/1981 | Toth | 221/13 |
| 4,629,090 A | * | 12/1986 | Harris et al. | 221/7 |
| 4,687,119 A | * | 8/1987 | Juillet | 221/150 HC |
| 4,730,750 A | * | 3/1988 | Ficken | 221/150 R |
| 4,823,984 A | * | 4/1989 | Ficken | 221/96 |
| 5,048,719 A | | 9/1991 | Empl et al. | |
| 5,150,817 A | | 9/1992 | Livingston | 221/81 |
| 5,341,954 A | * | 8/1994 | Smith | 221/85 |
| 5,651,476 A | * | 7/1997 | Percy et al. | 221/131 |
| 5,927,544 A | * | 7/1999 | Kanoh et al. | 221/90 |

FOREIGN PATENT DOCUMENTS

| | | |
|---|---|---|
| GB | 1428035 | 3/1976 |
| JP | 06203261 | 7/1994 |
| JP | 08320962 | 3/1996 |
| JP | 09050563 | 2/1997 |
| JP | 10241029 | 11/1998 |

* cited by examiner

*Primary Examiner*—Christopher P. Ellis
*Assistant Examiner*—Patrick Macky
(74) *Attorney, Agent, or Firm*—Klauber & Jackson

(57) ABSTRACT

A product dispenser with inventory monitoring, useful to be installed in hotel establishments and establishments providing similar services, including a refrigerating equipment and a plurality of product selection pushbuttons (2), in such a way that the dispenser (1), communicated with a central control, comprises a selection confirmation pushbutton (3); a separating plate (6) in horizontal position that defines a first compartment (7) and a second compartment (8) maintained at different temperatures, each one of the compartments having a plurality of compartmentalized trays (11) in which tray compartments are defined, each tray compartment having a conveyor belt (13), each conveyor belt being provided with a plurality of separators (14) between which the products are positioned; a first strip (18) along the entire length of the front of the dispenser over the closing gate (16) of the opening access (15) to the box (17) for receiving the dispensed products.

7 Claims, 4 Drawing Sheets

PRODUCT DISPENSER WITH INVENTORY MONITORING

OBJECT OF THE INVENTION

The present invention consists of a product dispenser with inventory monitoring, useful for its installation in rooms of a hotel establishment or establishments providing similar services. The dispenser is of the type of dispenser that automatically dispenses the product once it has been selected, in such a way that its inventory monitoring communicates with a central control in reception or in the offices of the establishment, so that at the very moment in which a product is dispensed the price of the same is applied to the customer's account.

The dispenser of this invention is especially useful in hotel establishments and establishments providing similar services, upon being located in a room, and communicated with the central control, in such a way that the client, in his own room, will be able to select the desired product and the price thereof will be automatically placed on his bill.

Hence, the client does not have access to the inside of the dispenser, and it is only necessary for the desired product to be selected and confirmed, so that the product is dispensed and placed on the client's bill.

Hence, the management of the hotel has perfect control over the expenses of each one of its clients, in such a way that the dispensers located in the different rooms dispense the products directly upon being selected and said selection being directly confirmed, without the dispensers needing a coin selector, since operation thereof is produced by means of the corresponding pushbuttons.

The dispenser has a refrigerating equipment and the cabinet of said dispenser has a separating plate, in order to obtain two areas having different temperatures, making it possible to store products that need to be kept at a low temperature and products that are kept at room temperature, it being possible to have a large variety of products that are normally consumed by hotel clients.

FIELD OF APPLICATION

The product dispenser with inventory monitoring of this invention is especially useful in hotel establishments and establishments providing similar services for being installed in the desired rooms, the same being communicated to a central control so that at the moment at which some product is dispensed, the price thereof is placed on the client's bill, like another service of the different services that the hotel may render, for which purpose the dispenser is not coinoperated but instead operated by selection pushbuttons and a selection confirmation pushbutton.

BACKGROUND OF THE INVENTION

Conventional dispensers in hotel rooms, comprise a refrigerator at the client's disposal, and optionally a second independent compartment, for keeping other products that do not need to be kept at a low temperature.

Hence, the clients may help themselves upon having direct access in order to consume the products, making note on the sheet provided by the hotel for this purpose, and when they check out they hand in the sheet in order to pay for the products.

In this way, the clients have different products available in their own rooms and hence soft drinks, alcoholic beverages contained in small bottles, and other products such as tobacco, rolls of film, perfumes, tapes for video cameras, etc. are normally available.

For this purpose, the dispenser may have a refrigerated compartment in which the bottles of soft drinks are contained, and a second compartment for the remaining products which do not need to be kept at a low temperature.

Hence, the clients may take the desired products and make note of them on the corresponding sheet provided for this purpose by the management of the hotel, so that when the sheet is handed in at the reception desk the products are paid for.

This form of operation has different inconveniences and hence, the first one of them is that if the clients do not report the acquired products, or they have not made note of them, when they check out of the establishment the management thereof does not make a check and the unreported acquired products are not paid for, which means an economic loss for the hotel.

Likewise, it may happen that certain unscrupulous clients, once certain beverages have been drunk, fill up the containers with other products, which is hardly detectable by the management of the hotel, but it may bring about serious inconveniences for the management of the hotel because of claims by third parties who consume such adulterated products.

DESCRIPTION OF THE INVENTION

In order to solve the aforecited inconveniences, a product dispenser with inventory monitoring which is of the type of dispensers that include a refrigerating equipment and product selection pushbuttons, is presented. The dispenser of this invention is communicated with a central control, and comprises, in addition to the selection pushbuttons, a selection confirmation pushbutton;

a separating plate in horizontal position that defines a first compartment and a second compartment in order to allow keeping these compartments at different temperatures;

a plurality of compartmentalized trays in the first compartment and in the second compartment, trays in which tray compartments are defined;

a plurality of conveyor belts, one per each one of the tray compartments of the compartmentalized trays, each one of the conveyor belts being provided with a plurality of separators between which the products are positioned;

a closing gate of an access opening to a box for receiving a dispensed product;

a channel through which a selected product falls;

a pivoting first strip over the closing gate of the access opening along the entire length of the front of the dispenser;

a sensor selected from a microswitch or a photocell being activated by the first strip upon being collapsed by a fallen dispensed product that has been previously selected, in such a way that the first strip itself operates as a damper in the fall of the products.

To obtain a product from the dispenser, it must be be selected by means of one of the selection pushbuttons, and then the selection confirmation pushbutton must be actuated, whereby the unitary dispensing mechanism corresponding to the selected product is actuated and the product is dispensed.

The separating plate in horizontal position that defines a first compartment and a second compartment at different temperatures, has a length similar to the length of the front of the dispenser and a width less than that of the width of the dispenser, thereby defining a channel along the entire length of the front of the dispenser, channel through which the products fall to the box for receiving the dispensed products.

The compartmentalized trays have, in each one of their respective tray compartments, conveyor belts provided with separators, arranged depending on the size of the products to be contained.

For loading the dispenser, the compartmentalized trays are movable towards the front outside of the dispenser on a plurality of guides this facilitating the loading operation to the person responsible therefor.

Inside and over the closing gate of the access opening to the box for receiving the dispensed products, the dispenser has a first strip that pivots with respect to an axis above the pivotal axis of the closing gate itself of the access opening, which encompasses the entire length of the front of the dispenser, and upon which the products to be dispensed fall, the strip in its pivotation actuating a sensor means selected from microswitches and photocells that communicates to the central control that the product has been dispensed, it being possible to directly charge the corresponding client's bill with the price thereof.

Opposite the first strip that activates the sensor means and the closing gate of the access opening to the box for receiving the dispensed products, the dispenser has a second strip whose free end is close to the free end of the first strip that activates the sensor menas, at the same time that it is above the pivoting end of the closing gate of the access opening restricting pivotation thereof and preventing a possible access to the inside of the dispenser.

When the closing gate is opened the gate pivots, and a sensor selected from a microswitch or a photocell is activated in such a way that the dispensing system of the dispenser is paralyzed preventing the dispensing of products while the closing gate is open.

In order to complete the description and in order to provide a better understanding of the characteristics of the invention, the present specification is accompanied by a set of drawings, in whose figures the most characteristic details of the invention are represented in an illustrative and non-restrictive manner.

DESCRIPTION OF A PREFERRED EMBODIMENT

Figure 1:
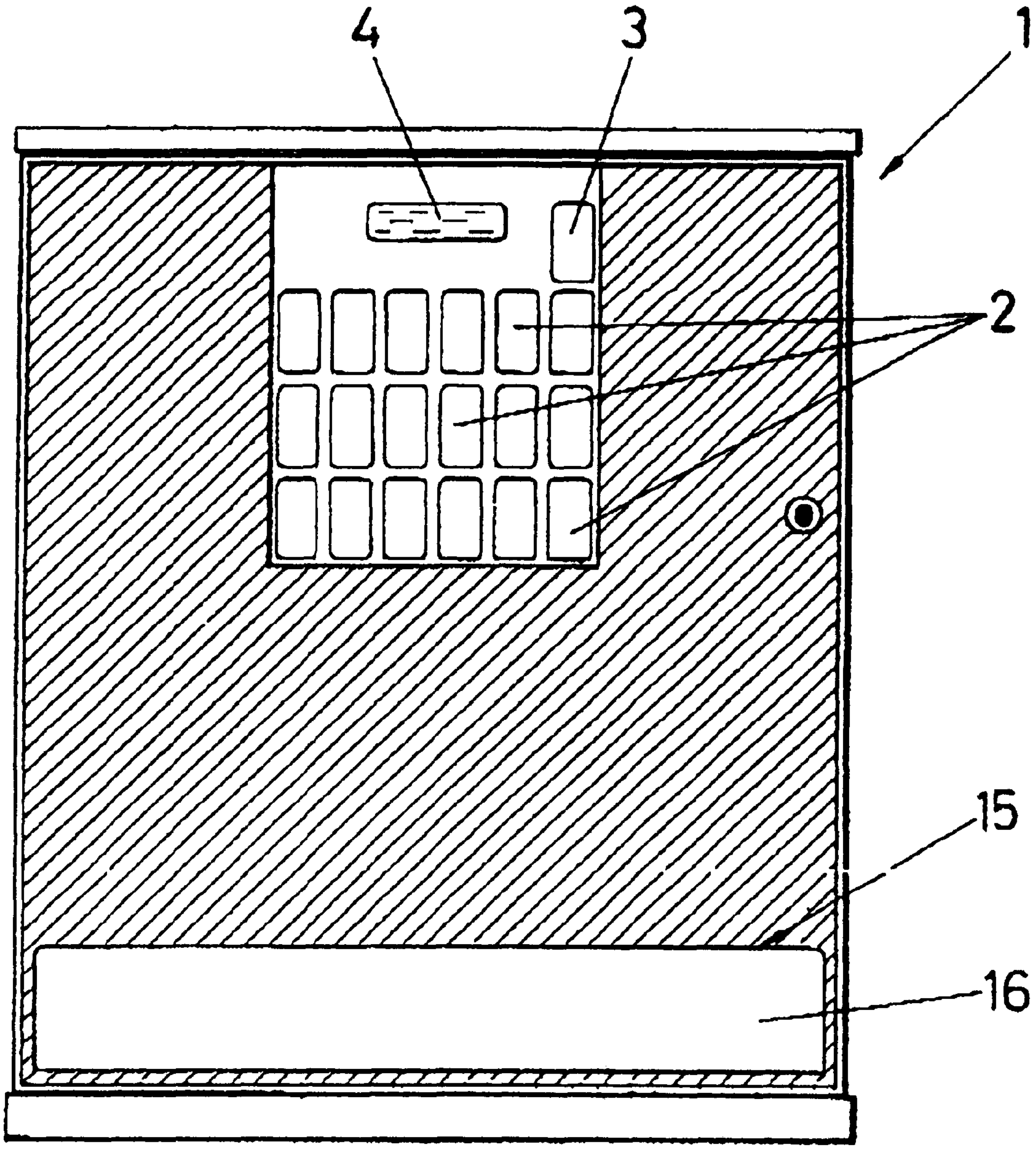
FIG. 1 is a front view of the product dispenser with inventory monitoring showing the center top area for location of selection pushbuttons, a confirmation pushbutton and a display, as well as the access opening to the box for receiving the dispensed products.
Figure 2:
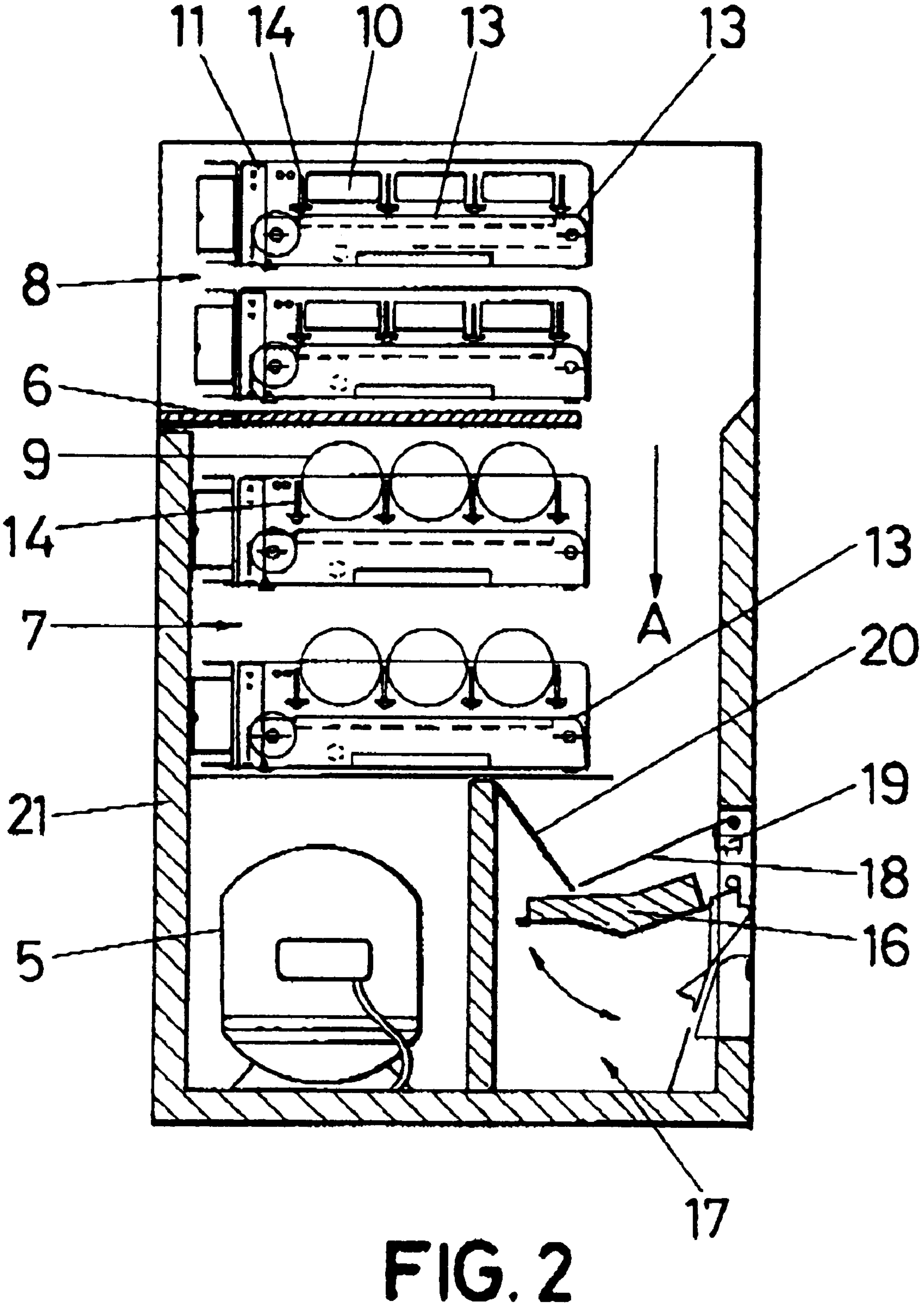
FIG. 2 is a cross section of the dispenser, according to a raised side view, showing the different parts of the dispenser, a horizontal plate defining a first compartment and a second compartment for storage of the products, the compartments allowing to keep the products at different temperatures.
Figure 3:
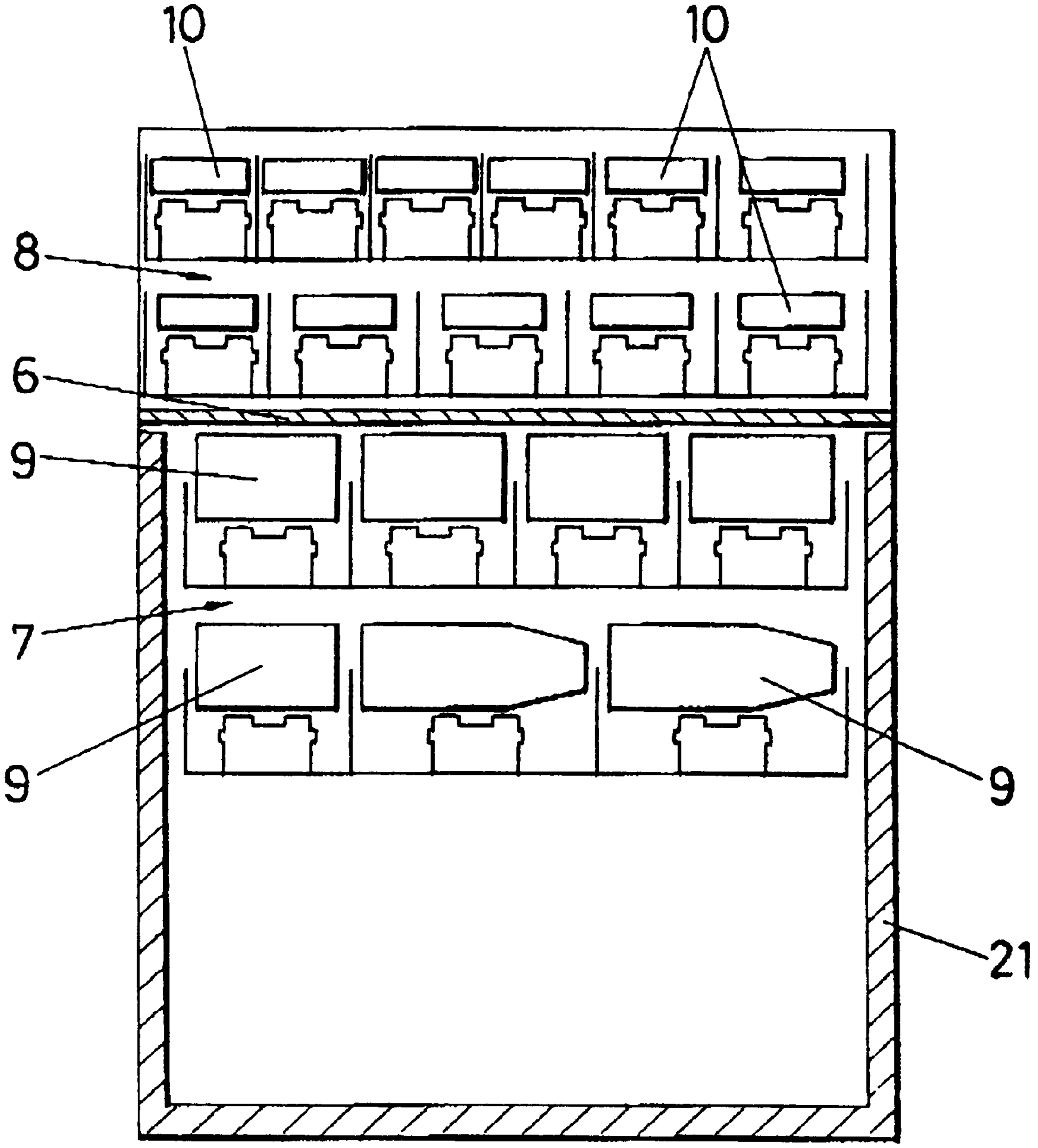
FIG. 3 is a cross section of the dispenser, according to a front view, showing the trays arranged in the first compartment and in the second compartment for the placement of the products, a series of tray compartments being defined in the trays, the tray compartments adapting to the dimensions of the products to be stored.

In view of the aforementioned figures and in accordance with the numbering used, we can see how the dispenser with inventory monitoring (1) has a series of product selection pushbuttons (2), as well as a selection confirmation pushbutton (3) and a display (4) where the selected product appears, in such a way that once the product has been selected, said selection should be confirmed with the pushbutton (3), given that in this way an attempt is made to prevent, as much as possible, erroneous selections, because since the dispenser (1) is communicated with a central control, once the product has been dispensed the price thereof is placed directly on the client's bill.

Hence, the dispenser (1) is preferably useful in hotel establishments and establishments providing similar services, in such a way that various dispensers installed in rooms are communicated with the central control, there not being any coin selector, and the price of the selected and dispensed product being placed directly on the client's bill, as another service of the hotel establishment.

In this way, the clients do not need to make note on the corresponding sheet prepared for this purpose of the products acquired from the dispenser that is installed in their room, so that when they check out of the hotel establishment upon handing in said sheet at reception the products indicated on the same are placed on their bill. Likewise, the authenticity of the product is guaranteed, as no client has access to the inside of the dispenser.

Besides, for the hotel establishment it represents the big advantage that all of the products that are purchased are placed directly on the bill of the client acquiring them.

Likewise, an additional important advantage is that, as the clients do not have direct access to the products, since the dispenser (1) is closed, among other things, it is prevented that unscrupulous people refill bottles whose contents have been drunk in which case, aside from the economic loss that this can represent if management of the hotel is not notified of the consumption of said product, health problems can be involved, problems which would bring about claims to the hotel establishment by the injured third parties.

So that the dispenser (1) can contain a certain diversity of products that make it more versatile, the dispenser includes a refrigerating equipment (5) in its bottom part, and so that products that should be kept at a low temperature may be stored therein, as well as other products that should be kept at room temperature only, the dispenser has a separating plate (6) that defines a first compartment (7) and a second compartment (8), that will be at different temperatures, the first compartment (7) containing products (9) that should be kept at a low temperature (approximately 4° C.), such as soft drinks, beer, etc. and in the top compartment (8) products (10) that are kept at room temperature (approximately 16° C.), such as for example condoms, perfume, small bottles of alcoholic beverages, rolls of film, tapes for video cameras, tobacco, etc.

In the first compartment (7) and in the second compartment (8) defined in the dispenser (1) by the plate (6) arranged in horizontal position, a plurality of trays (11) are arranged such that they are movable towards the front outside of the dispenser, on a plurality of guides (12). Said compartmentalized trays (11) have in each one of the tray compartments, respective endless belts (13) on which adjustable separators (14) are arranged between the products deposited thereon.

Figure 4:
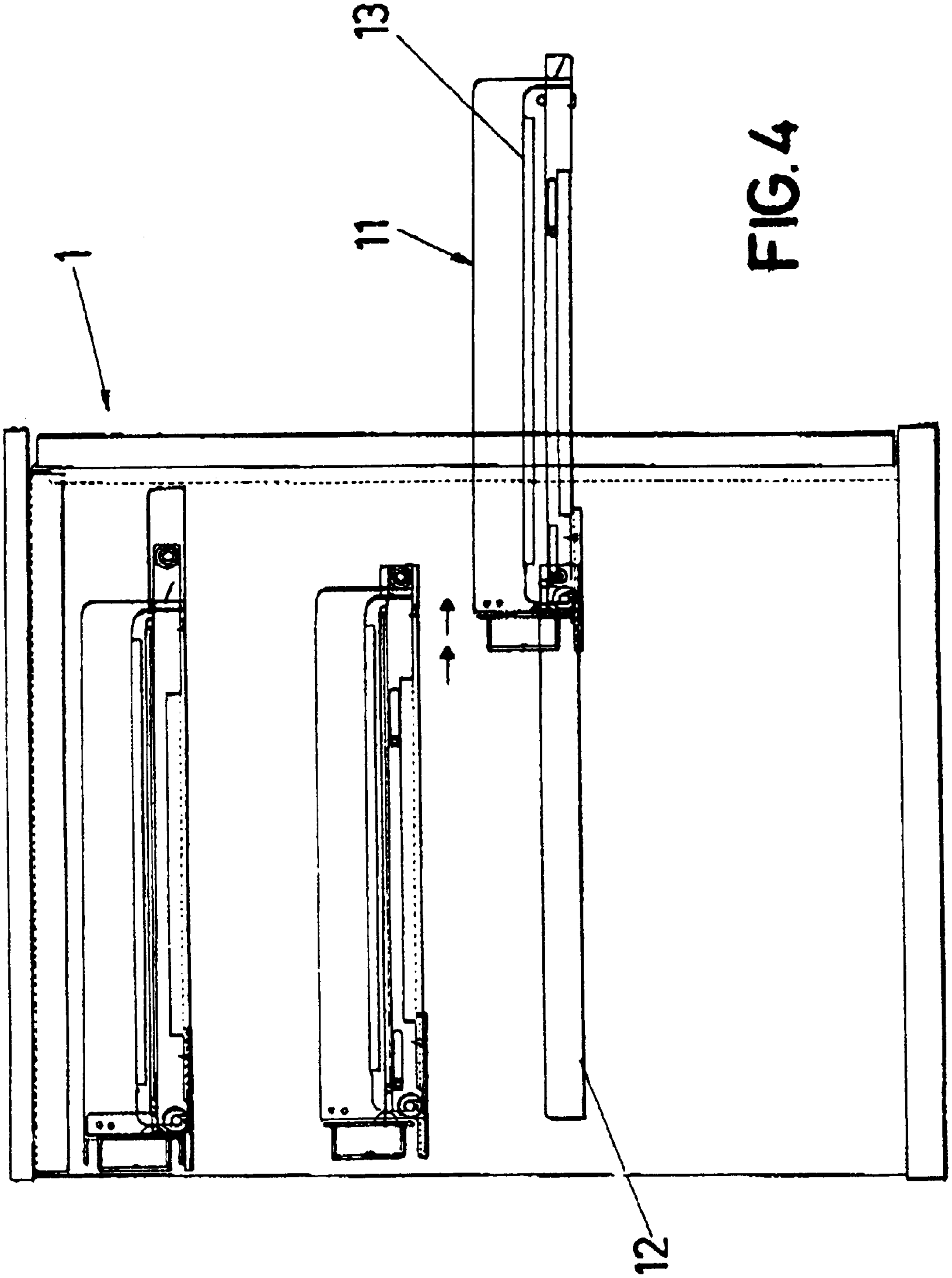
FIG. 4 is a raised schematic view of the way in which the compartmentalized trays for storing the products are opened, for loading the trays, showing how the movable trays can slide on a plurality of guides.

As shown in FIG. 4, when the trays (11) are to be loaded, the trays will slide forward, easy access along all of the compartments of the tray is provided and the loading thereof may be carried out in an easy manner.

When a client desires a product, he/she must select it by means of one of the pushbuttons (2), the selected product appearing on the display (4); the selection must be confirmed by means of the pushbutton (3), whereby the expelling mechanism of the selected product becomes activated, that is to say, the advance of the corresponding endless belt (13) will be activated moving the product until it falls through channel (A), towards the box (17) for receiving the expelled products. For this purpose, the travel and advance of the endless conveyor belt is regulated depending on the size of the thereon deposited product.

The product expelled from the conveyor belt will fall on the first strip (18) that covers the entire length of the front of the dispenser, in such a way that the pivotation of said first strip (18) activates the operation of a sensor (19) selected from a microswitch or a photocell that communicates the dispensing of the corresponding product to the central control so that the price thereof is automatically added to the client's account.

The sensor means (19), as it has already been said may be either a microswitch, or a photocell which carries out the same function.

The cited first strip (18) is above the closing gate (16) of the access opening (15) in such a way that the first strip itself (18) acts like a damping element of the fall of the products.

Likewise, opposite the first strip (18) and the closing gate itself (16), the dispenser has, in the box itself for receiving the dispensed products, a fixed second strip (20), whose free end is close to the free side of the first strip (18) in its inoperative position. This second strip directs the products towards the first strip (18) and simultaneously acts as a limiting element of the pivoting movement of the gate (16) when opened, thereby preventing a possible access to the inside of the dispenser through the box (17).

On the other hand, the dispenser (1) includes a photocell connected to the gate (16), in such a way that when opened, the gate (16) interferes with said photocell producing the paralyzation of the product dispensing system until the gate (16) closes, preventing products from being selected and dispensed when the gate (16) is open.

Of course, the dispenser (1) will be provided with the corresponding insulation (21) in order to maintain the desired temperature in its inside, this insulation being up to the level of the colder bottom compartment (7), as well as in connection with the refrigerating equipment and the closing gate (16) of the access opening to the box for receiving the dispensed products.

What is claimed is:

1. A product dispenser with inventory monitoring, the dispenser being communicated with a central control and comprising a plurality of selection pushbuttons, each selection pushbutton for use by a user to select a dispensable product, a selection confirmation pushbutton for the user confirming selection of a dispensable product that has been previously selected by actuating at least one selection pushbutton, a refrigerating equipment, a first compartment for storing dispensable products and a second compartment for storing dispensable products, the compartments being maintained at different temperatures, a horizontal separating plate which separates the first compartment from the second compartment, a plurality of compartmentalized trays in the first compartment and in the second compartment, an endless conveyor belt in each compartmentalized tray, a plurality of conveyor compartments on each conveyor belt, each of the conveyor compartments for positioning a dispensable product, each conveyor compartment being defined between separators provided on each conveyor belt, a channel into which a selected product among dispensable products is expelled from the conveyor belt carrying the dispensable product selected by means of the selection and confirmation pushbuttons, a box into which the selected product falls from said channel, the box having a frontal access opening extending over a whole front side of the dispenser, through which the selected product may be removed by the user, a closing gate for closing the access opening, a pivotable first strip over the closing gate, the first strip being collapsed when a selected product falls from the channel into the box, and a first sensor means selected from microswitches and photocells, being activated each time a selected product collapses the first strip.

2. A dispenser, according to claim 1, wherein the separating plate, has a length substantially the same as the front side of the dispenser, and a width smaller than the dispenser, the channel being defined over the box between the front side and the first and second compartments of the dispenser.

3. A dispenser, according to claim 1, wherein the conveyor compartments, on the conveyor belts are located between adjustable separators being adjustable to sizes of dispensable products.

4. A dispenser, according to claim 3 wherein each compartmentalized tray is movable on guides, towards the front side of the dispenser for loading thereof.

5. A dispenser, according to claim 1 wherein each compartmentalized tray is movable on guides, towards the front side of the dispenser for loading thereof.

6. A dispenser, according to claim 1, wherein the first pivoting strip pivots with respect to an axis over a pivotation axis of the closing gate, said first strip extending over the entire front side within the dispenser, said first strip activating, when pivoting, the sensor means which communicates with the central control, notifying said control that a selected product has been dispensed.

7. A dispenser, according to claim 1, wherein opposite the first strip, the dispenser has a second strip having a free end proximate to a free end of the first strip, said free end of the second strip being located above a pivoting free end of the closing gate, thereby limiting pivotation of the closing gate and blocking access to the channel.

* * * * *

UNITED STATES PATENT AND TRADEMARK OFFICE

CERTIFICATE OF CORRECTION

PATENT NO. : 6,360,140 B1
DATED : March 19, 2002
INVENTOR(S) : Felix Guindulain Vidondo It is certified that error appears in the above-identified patent and that said Letters Patent is hereby corrected as shown below:

Title page,
The Inventor's Name should be changed from "Felix Guindualian Vidondo" to read -- Felix Guindulain Vidondo --

Signed and Sealed this

Twenty-eighth Day of May, 2002

*Attest:*

JAMES E. ROGAN
*Director of the United States Patent and Trademark Office*

*Attesting Officer*